Aug. 13, 1929.  W. LEHMAN  1,724,207
EXCAVATOR OR THE LIKE
Filed Feb. 26, 1923  4 Sheets-Sheet 2
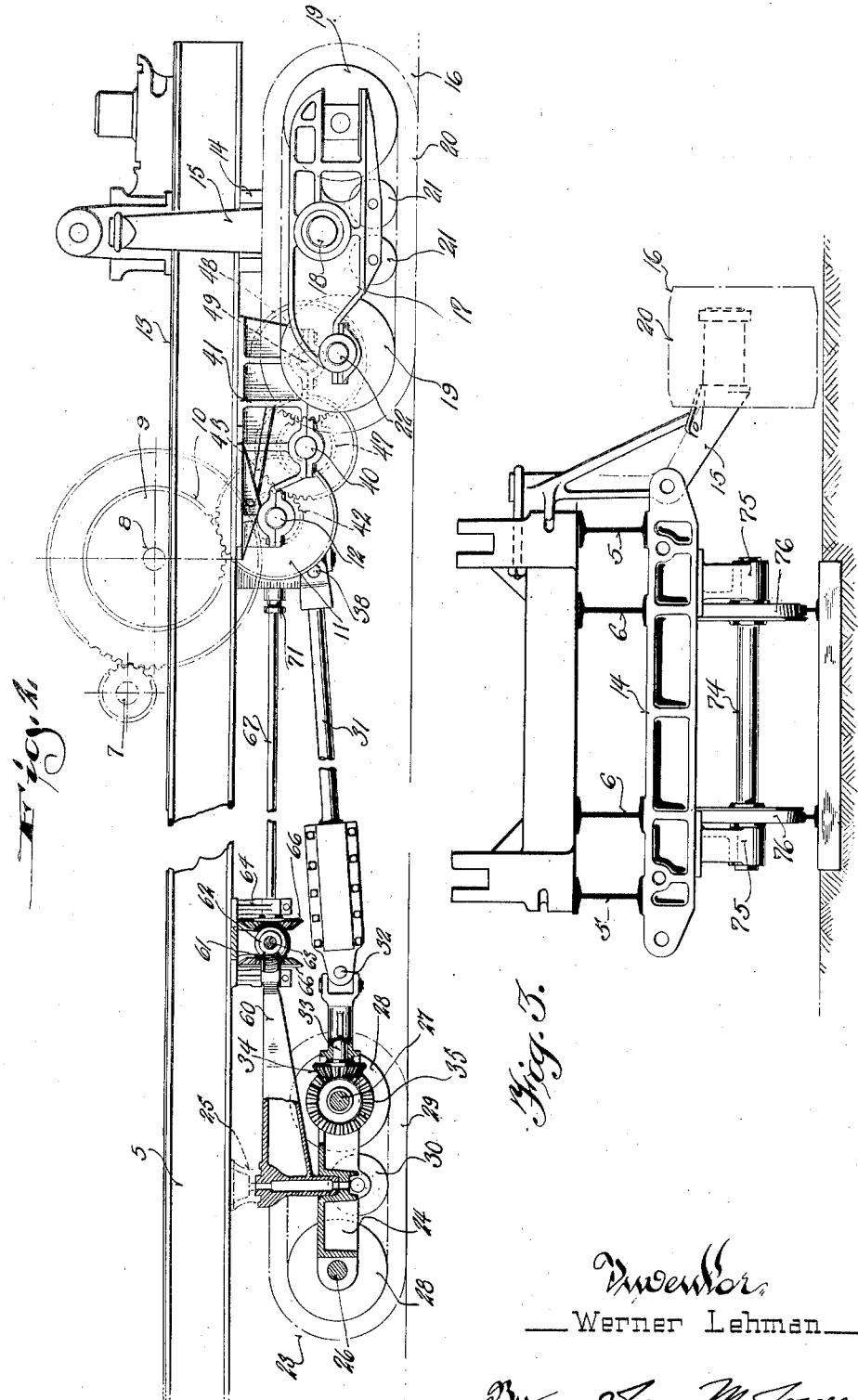
Inventor,
Werner Lehman
By Ira M. Jones.
Attorney.

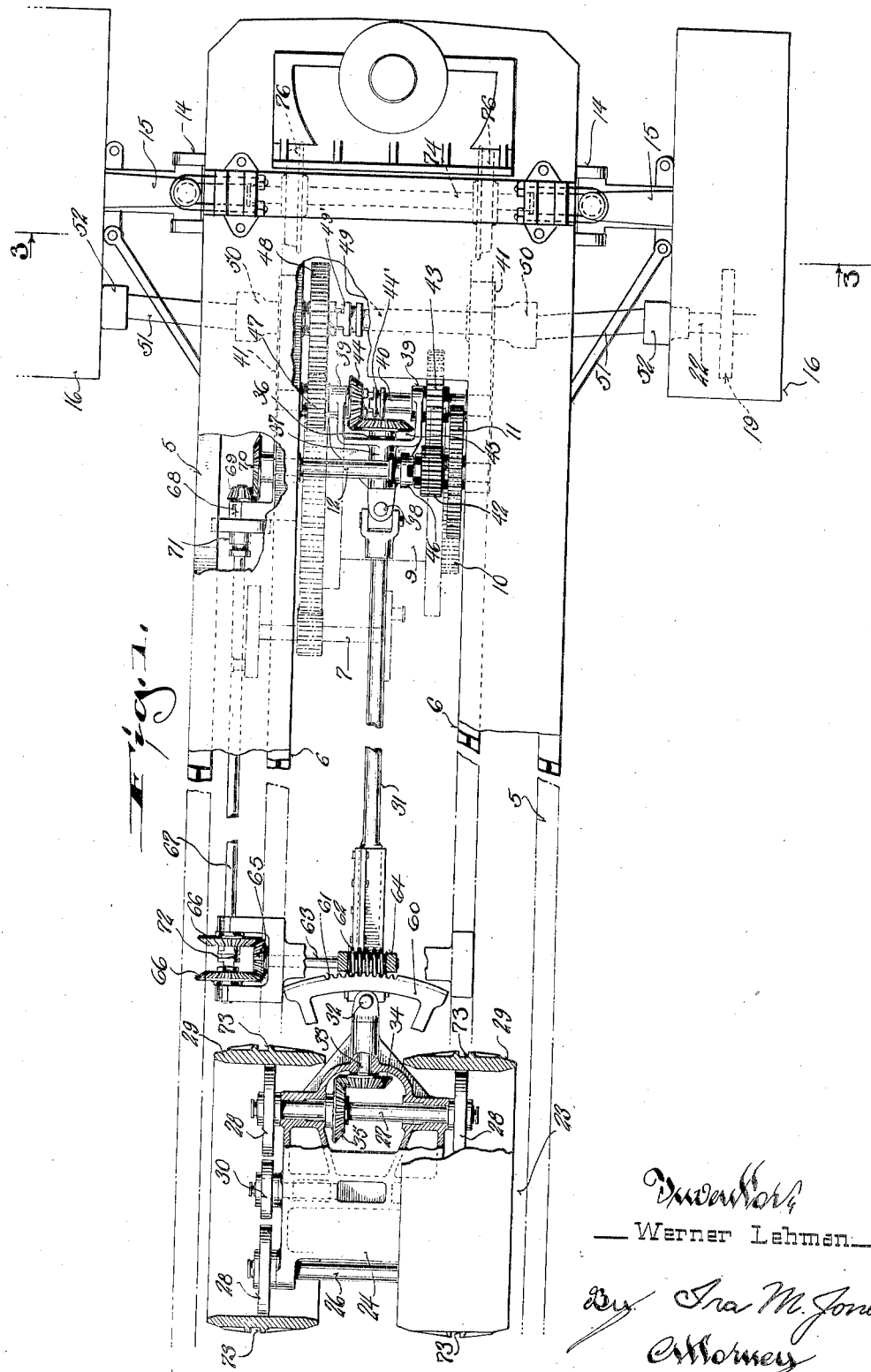

Aug. 13, 1929.  W. LEHMAN  1,724,207
EXCAVATOR OR THE LIKE
Filed Feb. 26, 1923  4 Sheets-Sheet 3
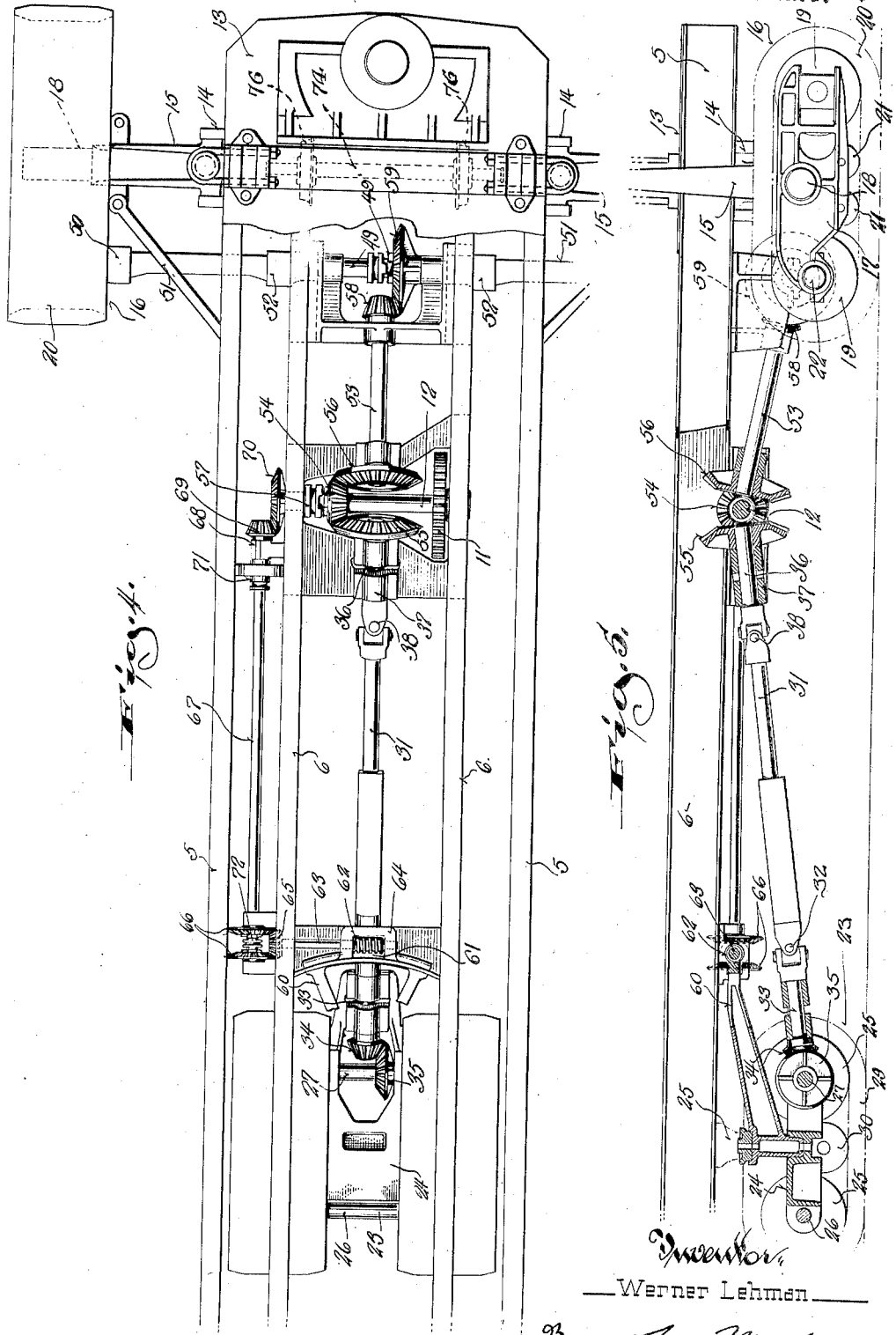
Inventor
Werner Lehman
By Ira M. Jones
Attorney Aug. 13, 1929.  W. LEHMAN  1,724,207
EXCAVATOR OR THE LIKE
Filed Feb. 26, 1923   4 Sheets-Sheet 4

Werner Lehman

Patented Aug. 13, 1929.

1,724,207

UNITED STATES PATENT OFFICE.

WERNER LEHMAN, OF SOUTH MILWAUKEE, WISCONSIN, ASSIGNOR, BY MESNE ASSIGNMENTS, TO BUCYRUS-ERIE COMPANY, OF SOUTH MILWAUKEE, WISCONSIN, A CORPORATION OF DELAWARE.

EXCAVATOR OR THE LIKE.

Application filed February 26, 1923. Serial No. 621,304.

This invention relates to certain new and useful improvements in excavators or the like, of that type illustrated in Letters Patent No. 1,448,372, granted me, jointly with Svante R. W. M. Bager and Otto F. Kaeser, March 13, 1923, of which this is a division as to all common subject matter and refers more particularly to the means for driving and steering the excavator and operating the hoisting mechanism thereof.

The present type of excavator or the like equipped with creeping traction members requires one engine for hoisting, and driving the traction members, and another for steering, necessitating two independent power units which not only increase production costs but occupy an unnecessary amount of space, whereas it is highly desirable to provide as much free space as possible in the excavator housing.

It is, therefore, an object of this invention to provide an excavator or the like in which but one engine is required for hoisting, driving the creeping traction members and steering, whereby considerable economy in construction and space is effected.

That type of excavator illustrated in the United States Letters Patent, granted to Svante R. W. M. Bager, Otto F. Kaeser and Werner Lehman, has three independent creeping traction units providing a three point support for the excavator, and experience has proven that the steering operation is not highly efficient when the traction member of the steering traction mounting unit runs idle and is not driven, and it is, therefore, another object of this invention to provide means for driving the steering creeping traction member to thus increase its effecting traction member to thus increase its effectiveness and facilitate steering of the excavator.

This invention has as another object the provision of a pair of creeping traction units for supporting the excavator frame near one end and a creeping traction unit for supporting the frame adjacent the other end and having means pivotally connecting each creeping unit with the frame at a single point whereby a true three point suspension for the excavator is provided.

It is a further object of this invention to provide means for driving all three creeping traction members providing a three point support for the excavator, the traction members being preferably driven from a single power unit.

In excavating machines it is customary to locate the excavating instrumentalities adjacent one end, as a result of which approximately two-thirds of the machine's normal load is supported by the means mounting the excavating end and the value of the load on this end of the machine is materially increased during excavating operations and it is, therefore, a further object of this invention to provide an excavating machine in which the propelling machinery for the end of the frame opposite the excavating instrumentalities travels at a slower speed than that at the excavating end so that it will be driven more as an idler instead of as an actual driver and at the same time insure the efficient steering operation thereof.

Another objectionable feature of the present type of excavators or the like provided with creeping traction members is that they have required a train of gears directly at the mountings for the traction members in order to produce the desired speed reduction, and it is a still further object of this invention to provide means for eliminating the usual train of gears at the traction mountings and provide a single gear reduction for all the traction members.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings I have illustrated several complete examples of the physical embodiment of my invention constructed according to the best modes I have so far devised for the practical application of the principles thereof, and in which:

Figure 1 is a view looking down on an excavator or the like frame embodying my invention, parts thereof being broken away and in section in order to illustrate structural details;

Figure 2 is a side view thereof, parts being broken away and in section;

Figure 3 is a view taken transversely through Figure 1 on the line 3—3 and illustrating the manner of mounting a semi-railway truck at the forward end medially of the forward pair of creeping traction mountings;

Figure 4 is a view similar to Figure 1 illustrating a slightly modified form of my invention;

Figure 5 is a view, partly in side elevation and partly in section, illustrating that form of my invention depicted in Figure 4;

Figure 6:
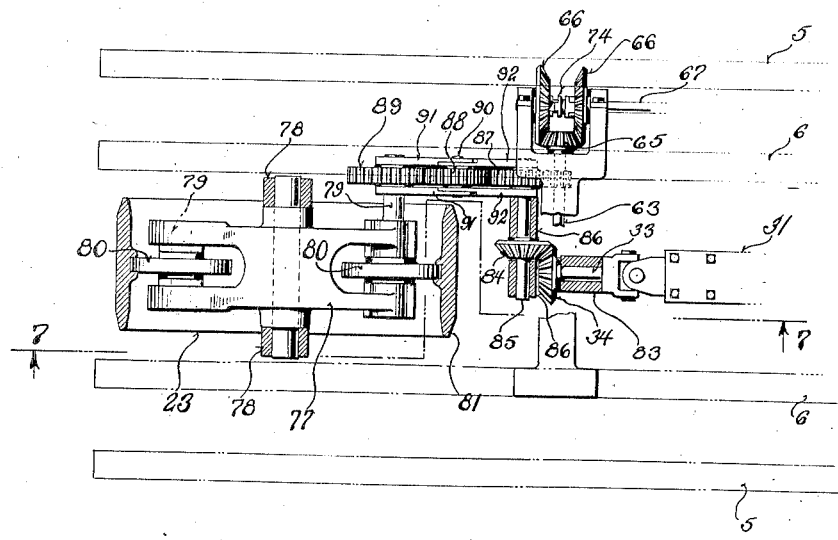
Figure 6 is a view, partly in section and partly in elevation, illustrating a modified construction of rear traction unit employing a single creeping traction member.

Excavating machines, or shovels as they are commonly termed, of the railway type, have heretofore been supported at their opposite ends by railway trucks, the boom carrying the excavating instrumentalities being mounted adjacent the forward end and braced from an "A-frame" so designed as to convey all stresses to a bolster structure extended transversely of the frame and provided at its ends with laterally extended jack arms in the outer ends of which screw jacks or other ground engaging members are mounted. The screw jacks are engaged with the ground during digging operations to transmit all digging stresses from the boom directly to the ground without passing through the excavator frame proper. This conventional type of structure is best disclosed in the Letters Patent No. 580,189, granted April 6, 1897, to King; No. 760,456, granted May 24, 1904, to King; No. 845.770, granted Walter Ferris and Svante R. W. M. Bager, March 6, 1917; No. 882,086, granted John Webber, March 17, 1908, and No. 901,101, granted Charles F. Hinkley, October 13, 1908.

This invention relates to the provision of creeping traction units for supporting the excavator as illustrated in Letters Patent No. 1,448,372, granted Svante R. W. M. Bager, Otto F. Kaeser and Werner Lehman, March 13, 1923, and of which this application is a continuation as to all common subject matter.

Two conditions exist in connection with excavators of the character described in the last mentioned letters patent; first, at all times two-thirds of the weight of the excavator is carried by the forward creeping traction units; secondly, while digging, the entire downward digging stress is carried directly by the front creeping traction units, being transmitted therethrough through the truss arrangement and the bolster frame. Because of these two conditions, it is essential that the front creeping traction units have a greater ground engaging surface or area than the rear creeping traction unit.

Owing to the greater ground engaging area or surface of the creeping traction units and to the greater weight of the front end of the machine, it is evident that the front creeping traction units will bear most of the propelling strain and that it will also be unnecessary for the rear creeping traction unit to bear any of the propelling strain. This last mentioned fact makes it feasible to drive the rear creeping traction unit more slowly than the front units and thus insure that they will bear none of the propelling strain, but merely have sufficient drive to insure the proper functioning of the steering mechanism, which is properly located in the rear unit.

Thus the rear creeping traction units having been insured against bearing any of the propelling strain, by reason of the less weight of the rear end, the less ground engaging surface or area of the rear creeping traction unit and the slower speed thereof, it is possible to build the driving machinery of the rear driving unit lighter than that of the front creeping traction units, thereby saving considerable weight and expense.

Referring now more particularly to the accompanying drawings, in which like numerals designate like parts throughout the several views, the numerals 5 and 6 designate the outer and inner longitudinal I-beams or sills, respectively, constituting the framework of the excavator upon which is mounted a suitable power plant, not shown, having a crank or drive shaft 7 geared to a shaft 8 mounting a hoisting drum or unit 9 and carrying a gear 10 which meshes with a gear 11 fixed on a shaft 12 and from which the excavator driving and steering mechanisms are operated. The shaft 7 and the hoisting unit are illustrated by conventional or structural lines in Figure 2 and are suitably mounted to extend above the platform or flooring 13 of the excavator to be protected by the usual housing, not shown.

Transversely secured to the excavator frame adjacent its forward end is a casting 14 having its ends extended slightly beyond the outer sills 5 to provide means for attachment thereto of jack-arms 15 on the outer ends of which are mounted creeping traction mountings or units 16, now about to be described.

Each creeping traction unit 16 comprises a frame 17 medially pivotally mounted on the outer end 18 of the jack-arm and having a wheel 19 journaled in each end around which is trained a creeping traction member or tread 20, the lower tread of which is medially braced by idle wheels 21 journaled in the frame. The pivotal connections between the creeping traction mountings 16 and the jack-arms accommodate for any unevenness in the surface over which the same pass and the traction members are driven from the shaft 12 through the medium of gears and shafting, to be later described, connected with the shaft 22 of one wheel 19 of each mounting.

The rear of the excavator is supported by a creeping traction mounting or unit 23 comprising a frame 24 pivotally connected with a casting 25 extended across the sills of the excavator frame, the casting being depicted in figures 2 and 5 by conventional or constructional lines. Journaled in the opposite ends of the frame 24 are shafts 26 and 27 carrying a wheel 28 on each end, a creeping traction member or tread 29 being trained about each adjacent pair of wheels 28, and having its lower tread medially braced by an idle wheel 30. The traction members 29 are driven from shaft 12 through shaft 40 by a drive shaft 31 having its rear end connected through a universal joint 32 with a stub shaft 33 journaled in the forward end of frame 24 and having a drive pinion 34 fixed thereto which meshes with a beveled gear 35 fixed to the shaft 27.

Shaft 31 consists of two slidably but non-rotatably connected parts in order to accommodate the movement of mounting 23 on its pivot as will be readily obvious. The forward end of the shaft 31 is connected with a stub shaft 36, journaled in a bearing bracket 37, by a universal joint 38, the bearing bracket, in that form of my invention illustrated in Figures 1 and 2, having two spaced axially aligned bearing arms 39 in which is journaled a counter-shaft 40 having its ends journaled in bearings carried by castings 41 secured to the sills 6. Shaft 12 is journaled in bearings carried by castings 41 and is drivingly connected with shaft 40 through gears 42 and 43. A drive pinion 44 is freely journaled on shaft 40 and has a clutch 44' for making the same fast to the shaft, said pinion meshing with a bevel gear 45 fixed to stub shaft 36. Gear 42 is freely journaled on shaft 12 and has a clutch mechanism 46 for drivingly connecting the same with shaft 12 to drive the traction mounting simultaneously with the steering mechanism, to be later described.

The traction members 20 of the forward units are driven from a gear 47 fixed to shaft 40 and meshed with a gear 48 mounted on a drive shaft 49 journaled in bearings carried by castings 41. Shaft 49 and drive shafts 22 of the forward creeping traction units are in approximate alinement and socket members 50 are carried by the outer ends of shafts 49 to receive the inner ends of coupling drive pins 51 having their outer ends secured in sockets 52 carried by the shafts 22. This construction permits free movement of the forward traction units 16 on horizontal axes without disturbing the drive connections between the traction members and their drive shaft. The drive of the forward traction units 16 may be rendered inoperative without disturbing the drive of the rear traction unit or the steering mechanism, to be later described, by a clutch mechanism 49'.

To advance the excavator, the engine, not shown, is operated to rotate shaft 7 in the proper direction and clutches 46, 44' and 49' are each thrown into operative positions by means of any conventional type of control, not shown, the traction members of mountings 16 and mounting 23 being then driven through the gearing heretofore described. The excavator is reversed by reversing the engine, as will be readily apparent.

In that form of my invention illustrated in figures 4 and 5, shaft 12 is directly geared to the rearwardly extending driving shaft 31 and a forwardly extended driving shaft 53, connected with the traction members 20 of the units 16, by a drive pinion 54 meshing with beveled gears 55 and 56 fixed to the inner ends of stub shaft 36 and driving shaft 53, respectively, pinion 54 being connectible with shaft 12 by a clutch mechanism 57. The drive of shaft 53 is transmitted to the shaft 49 through a pinion gear 58 fixed to the forward end of shaft 53 and meshing with a gear 59 mounted on shaft 49. The operation of this form of my invention is identical with that form illustrated in Figures 1 and 2 and, therefore, further description is deemed unnecessary.

Connected with the frame 24 is a steering arm or quadrant 60, the outer end of which is provided with gear teeth 61 with which a worm gear 62, fixed to a shaft 63, meshes. Shaft 63 is journaled in bearings formed on a bracket 64 connected across the sills 6 and has a pinion gear 65 on its outer end meshing with a pair of opposed gears 66 freely rotatably mounted on the adjacent end of a shaft 67 journaled in bearings carried by bracket 64 and a bearing 68 secured to the excavator frame adjacent shaft 12. The forward end of shaft 67 has a pinion gear 69 fixed thereon which meshes with a drive gear 70 mounted on the adjacent end of shaft 12. Shaft 67 is connectible with shaft 12 by a clutch mechanism 71 and when it is desired to steer the excavator, one of the gears 66, depending upon the direction in which it is desired to steer the excavator, is drivingly connected with shaft 67 by manipulation of a clutch member 72 and shaft 67 is drivingly connected with shaft 12 by manipulation of the clutch 71, as will be readily obvious.

As it is occasionally desired to transport the excavator over rails, in order to save time in going from one place of work to another, or for any other purpose, the treads of the traction members 29 are grooved, as at 73, to engage over the standard railroad rails and an axle 74 is journaled in bearings 75 carried by casting 14 and has railway wheels 76 mounted thereon. The lowermost part of wheels 76 are on a slightly higher plane than the lower treads of traction members 20 so that when the excavator is supported on a track structure the units 16 are free of the ground and when the units 16 are in ground engaging position the wheels 76 are free of the ground.

As approximately two-thirds of the entire weight of machines of the type described is disposed at the forward end, as hereinbefore set forth, the creeping members of the rear units are constructed with less ground engaging surface than the creeping members of the forward units and the propelling mechanism thereof is constructed lighter than that of the forward units. This is made possible, and the manipulation of the machine facilitated, by driving the forward creeping traction members 20 at a greater speed than the creeping traction member or members of the rear unit. In this way the propelling machinery for driving the rear truck can be designed lighter because it can be reasonably ascertained that only a small part of the possible driving power of the machine will be taken by the rear truck, but it will still have sufficient tractive power and support to sufficiently move the rear truck for steering.

Figure 7:
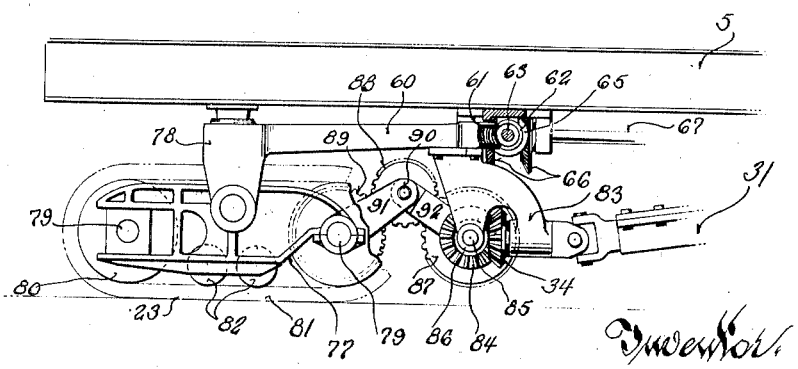
Figure 7 is a side view, with parts broken away, taken through Figure 6 on the plane of the line 7—7.

If desired, the rear traction unit 23 may be constructed as illustrated in Figures 6 and 7, in which a frame member 77 is journaled for movement on a horizontal axis between two, spaced, depending arms 78 carried by the inner end of the quadrant 60. Frame member 77 is provided with a pair of alined, spaced bearings at each end in which the shafts 79 of guide wheels 80 are journaled, a creeping traction member 81 being trained around the guide wheels and having its lower-most run medially braced by idle wheels 82.

The stub drive shaft 33 is journaled in a bearing 83 carried by a bracket member rigidly connected with and depending from the quadrant 60, the pinion gear 34 meshing with a bevel gear 84 fixed to a transverse shaft 85 journaled in bearings 86 carried by the bracket member. Shaft 85 is drivingly connected with the forward shaft 79 by a gear 87 mounted thereon and meshing with an idler gear 88 meshing with a gear 89 mounted on one end of the forward shaft 79.

To prevent the disengagement of the gears 87, 88 and 89 upon movement of the unit 23 on its horizontal axis, the idler gear is carried by a floating shaft 90 connected with the forward shaft 79 and the shaft 85 by links 91 and 92, respectively. The links 91 and 92 are normally at an angle with each other so that a downward movement of the forward end of unit 23 will tend to increase the angle and an upward movement tend to decrease the angle without disturbing the drive connection between the gears.

With this construction, a single power plant is required to drive the traction members, operate the hoisting unit and steer the excavator, eliminating the several power units heretofore employed and the large and cumbersome train of gears heretofore required at the traction mountings and providing a single gear reduction mounted on the excavator frame proper in their place; and driving all three of the traction mountings or units, thus effecting material economy in operation and facilitating the handling of the excavator. With the construction illustrated, it will also be readily evident that a true three point suspension is provided, one point being on the axis of each jack arm journal 18 and the other point at the casting 25.

While I have described and illustrated the application of this invention in connection with an excavator, it will be understood that it may be applied to cranes, derricks or any other type of machine to which the same is adaptable.

What I claim as my invention is:

1. An excavator, comprising a supporting frame, traction means supporting the frame and positioned adjacent the front and rear ends of the frame, and means for driving the traction means, the traction means at one end being positively driven at a peripheral speed greater in a predetermined ratio than that of the traction means at the other end.

2. An excavator, comprising a supporting frame, traction means supporting said frame and including a pair of traction units adjacent one end of the frame and a single traction unit adjacent the other end thereof, and means for driving all three traction units, said pair of units being positively driven at a peripheral speed greater in a predetermined ratio than that of the single unit.

3. An excavator, comprising a supporting frame, traction means supporting said frame and including a pair of creeping traction units adjacent one end of the frame and a single creeping traction unit adjacent the other end thereof, and a single drive shaft for driving all three creeping traction units, the single creeping traction unit being positively driven at a peripheral speed less in a predetermined ratio than that of the pair of units.

4. An excavator, comprising a supporting frame, traction means supporting said frame and including a pair of creeping traction units adjacent one end of the frame and a single creeping traction unit adjacent the other end thereof, a single drive shaft for driving all three creeping traction units, the single creeping traction unit being positively driven at a peripheral speed less in a predetermined ratio than that of the pair of units, and means for steering the single creeping traction unit.

5. In a machine of the character described having a frame, excavating instrumentalities supported on the frame adjacent one end and imposing thereon greater stress than that on the other end of the frame, traction means supporting the ends of the frame, the traction means supporting the end of the frame mounting the excavating instrumentalities having a greater ground engaging area than the traction means supporting the other end of the frame, and means for driving the second traction means at a speed less in a predetermined ratio than that of the other traction means.

6. In a machine of the character described having a frame, excavating instrumentalities supported on the frame adjacent one end and imposing thereon greater stress than that on the other end of the frame, creeping traction means supporting the ends of the frame, the traction means adjacent the end mounting the excavating instrumentalities having a greater ground engaging area than the traction means supporting the other end of the frame, means for driving the creeping traction means at the end of the frame mounting the excavating instrumentalities, means for driving the second creeping traction means at a speed less in a predetermined ratio than that of the other creeping traction means, and means for steering the second creeping traction means.

7. In a machine of the character described having a frame, excavating instrumentalities supported on the frame adjacent one end and imposing thereon greater stress than that on the other end of the frame, traction means supporting the ends of the frame, the traction means supporting the end of the frame mounting the excavating instrumentalities having a greater ground engaging area than the traction means supporting the other end of the frame, and means for driving the second traction means at a speed less in a predetermined ratio than that of the other traction means, the means for driving the first mentioned creeping traction means being of sturdier construction than the means for driving the other creeping traction means.

8. In an excavator, a supporting frame structure including instrumentalities supported on the frame structure adjacent its forward end and imposing thereon greater stress than that on its rearward end, three independent creeping traction units for supporting, driving, and steering the excavator, two of said units being arranged one on each side of the forward end of the frame structure and spaced apart by at least the width of the frame structure and the third of said units being compacted to less than the width of the frame and located wholly therebeneath on a fore-and-aft line intermediate of the other two units, means whereby the excavator may be steered, means for driving the forward pair of units, and means for driving the rearward unit at a speed less, in a predetermined ratio, than that of the forward units.

In testimony whereof I affix my signature.

WERNER LEHMAN.